US010977864B2

(12) United States Patent
Newhouse et al.

(10) Patent No.: US 10,977,864 B2
(45) Date of Patent: Apr. 13, 2021

(54) TECHNIQUES FOR CAPTURING AND DISPLAYING PARTIAL MOTION IN VIRTUAL OR AUGMENTED REALITY SCENES

(71) Applicant: Dropbox, Inc., San Francisco, CA (US)

(72) Inventors: Benjamin Zeis Newhouse, San Francisco, CA (US); Terrence Edward McArdle, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 506 days.

(21) Appl. No.: 14/628,113

(22) Filed: Feb. 20, 2015

(65) Prior Publication Data

US 2015/0243085 A1 Aug. 27, 2015

Related U.S. Application Data

(60) Provisional application No. 61/942,970, filed on Feb. 21, 2014.

(51) Int. Cl.
*G09G 5/00* (2006.01)
*G06T 19/00* (2011.01)
(Continued)

(52) U.S. Cl.
CPC ............ *G06T 19/006* (2013.01); *G06T 11/00* (2013.01); *G06T 15/20* (2013.01); *H04N 5/77* (2013.01); *G06T 2215/16* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 5,287,437 A 2/1994 Deering
5,745,126 A 4/1998 Jain et al.
(Continued)

FOREIGN PATENT DOCUMENTS

WO 2008/107553 A2 9/2008
WO WO2008/107553 9/2008

OTHER PUBLICATIONS

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://ir.exp.sis.pitt.edu/res2/data/is/group5/>.
(Continued)

*Primary Examiner* — Gordon G Liu
(74) *Attorney, Agent, or Firm* — Keller Jolley Preece

(57) ABSTRACT

The present disclosure relates to techniques for capturing and displaying partial motion in VAR scenes. VAR scenes can include a plurality of images combined and oriented over any suitable geometry. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and combined with a preexisting or simultaneously captured VAR scene, and the dynamic content may be played back upon selection.

20 Claims, 9 Drawing Sheets

(51) Int. Cl.
*G06T 15/20* (2011.01)
*G06T 11/00* (2006.01)
*H04N 5/77* (2006.01)

(58) Field of Classification Search
USPC ........................................................ 345/633
See application file for complete search history.

(56) References Cited

U.S. PATENT DOCUMENTS

| | | | |
|---|---|---|---|
| 5,841,439 | A | 11/1998 | Pose et al. |
| 5,990,941 | A | 11/1999 | Jackson et al. |
| 6,226,669 | B1 | 5/2001 | Huang et al. |
| 6,389,179 | B1 | 5/2002 | Katayama et al. |
| 6,760,026 | B2 | 7/2004 | Li et al. |
| 7,133,068 | B2 | 11/2006 | Fisher et al. |
| 7,136,090 | B1* | 11/2006 | McDuffie White .... G03B 15/10 348/14.08 |
| 7,224,326 | B2 | 5/2007 | Sefton |
| 7,389,591 | B2 | 6/2008 | Jaiswal et al. |
| 7,424,218 | B2 | 9/2008 | Baudisch et al. |
| 7,499,586 | B2 | 3/2009 | Agarwala et al. |
| 7,564,469 | B2 | 7/2009 | Cohen |
| 7,688,346 | B2 | 3/2010 | Richards |
| 8,041,574 | B2 | 10/2011 | Yano |
| 8,144,232 | B2 | 3/2012 | Larson et al. |
| 8,154,634 | B2* | 4/2012 | Fukumoto .......... H04N 5/23232 348/252 |
| 8,301,159 | B2 | 10/2012 | Hamynen et al. |
| 8,373,573 | B2 | 2/2013 | Chou et al. |
| 8,384,718 | B2 | 2/2013 | Dahlke |
| 8,698,902 | B2* | 4/2014 | Kawamoto ........... G06T 19/006 348/207.1 |
| 8,730,156 | B2 | 5/2014 | Weising et al. |
| 8,907,983 | B2 | 12/2014 | McArdle et al. |
| 8,953,022 | B2 | 2/2015 | McArdle et al. |
| 9,017,163 | B2 | 4/2015 | Newhouse et al. |
| 9,271,025 | B2* | 2/2016 | McArdle .......... H04N 21/23412 |
| 9,418,479 | B1* | 8/2016 | Worley, III ........ G01B 11/2513 |
| 2001/0030693 | A1 | 10/2001 | Fisher et al. |
| 2002/0140666 | A1 | 10/2002 | Bradski |
| 2002/0158873 | A1 | 10/2002 | Williamson |
| 2003/0065668 | A1 | 4/2003 | Sowizral et al. |
| 2003/0174136 | A1 | 9/2003 | Emberling et al. |
| 2004/0027330 | A1 | 2/2004 | Bradski |
| 2005/0219239 | A1 | 10/2005 | Mashitani et al. |
| 2005/0232507 | A1 | 10/2005 | Zimmer |
| 2005/0286125 | A1 | 12/2005 | Sundstrom et al. |
| 2006/0050140 | A1 | 3/2006 | Shin et al. |
| 2006/0082692 | A1 | 4/2006 | Kamijima et al. |
| 2006/0232665 | A1 | 10/2006 | Schowengerdt et al. |
| 2006/0239525 | A1 | 10/2006 | Katayama et al. |
| 2007/0025723 | A1 | 2/2007 | Baudisch et al. |
| 2007/0035562 | A1 | 2/2007 | Azuma et al. |
| 2007/0076016 | A1 | 4/2007 | Agarwala et al. |
| 2007/0103543 | A1 | 5/2007 | Anderson et al. |
| 2007/0168418 | A1 | 7/2007 | Ratnakar |
| 2007/0236493 | A1 | 10/2007 | Horiuchi et al. |
| 2008/0042973 | A1 | 2/2008 | Zhao et al. |
| 2008/0071559 | A1 | 3/2008 | Arrasvuori |
| 2008/0082692 | A1 | 4/2008 | Yano |
| 2008/0094417 | A1 | 4/2008 | Cohen |
| 2008/0194323 | A1 | 8/2008 | Merkli et al. |
| 2008/0266326 | A1 | 10/2008 | Porwal |
| 2008/0280676 | A1 | 11/2008 | Distanik et al. |
| 2008/0292131 | A1 | 11/2008 | Takemoto et al. |
| 2008/0309508 | A1 | 12/2008 | Harmon |
| 2008/0320422 | A1 | 12/2008 | Cazeaux |
| 2009/0140887 | A1 | 6/2009 | Breed et al. |
| 2009/0237564 | A1 | 9/2009 | Kikinis et al. |
| 2009/0240431 | A1 | 9/2009 | Chau et al. |
| 2009/0244097 | A1 | 10/2009 | Estevez |
| 2009/0292774 | A1 | 11/2009 | Box et al. |
| 2010/0001980 | A1 | 1/2010 | Kim et al. |
| 2010/0002122 | A1 | 1/2010 | Larson et al. |
| 2010/0007657 | A1 | 1/2010 | Rurin |
| 2010/0066763 | A1 | 3/2010 | MacDougall et al. |
| 2010/0092079 | A1 | 4/2010 | Aller |
| 2010/0125816 | A1 | 5/2010 | Bezos |
| 2010/0161658 | A1 | 6/2010 | Hamynen et al. |
| 2010/0169837 | A1 | 7/2010 | Hyndman |
| 2010/0171758 | A1 | 7/2010 | Maassel et al. |
| 2010/0188397 | A1 | 7/2010 | Tsai et al. |
| 2010/0208033 | A1* | 8/2010 | Edge ................. G06F 3/012 348/46 |
| 2010/0214111 | A1 | 8/2010 | Schuler et al. |
| 2010/0228633 | A1 | 9/2010 | Guimaraes et al. |
| 2010/0287485 | A1 | 11/2010 | Bertolami et al. |
| 2011/0041060 | A1 | 2/2011 | Chien et al. |
| 2011/0069229 | A1 | 3/2011 | Lord |
| 2011/0090252 | A1 | 4/2011 | Yoon et al. |
| 2011/0164116 | A1 | 7/2011 | Gay et al. |
| 2011/0201362 | A1 | 8/2011 | Bregman-Amitai et al. |
| 2011/0213861 | A1 | 9/2011 | Fanelli et al. |
| 2011/0216060 | A1 | 9/2011 | Weising |
| 2011/0234631 | A1 | 9/2011 | Kim et al. |
| 2011/0242134 | A1 | 10/2011 | Miller et al. |
| 2011/0248987 | A1 | 10/2011 | Mitchell |
| 2011/0273451 | A1 | 11/2011 | Salemann |
| 2012/0026166 | A1 | 2/2012 | Takeda et al. |
| 2012/0105440 | A1 | 5/2012 | Lieberman et al. |
| 2012/0105483 | A1 | 5/2012 | Fedorovskaya et al. |
| 2012/0113264 | A1 | 5/2012 | Moshrefi et al. |
| 2012/0194553 | A1 | 8/2012 | Osterhout et al. |
| 2012/0212405 | A1 | 8/2012 | Newhouse et al. |
| 2012/0214590 | A1 | 8/2012 | Newhouse et al. |
| 2012/0218306 | A1 | 8/2012 | McArdle et al. |
| 2012/0236029 | A1 | 9/2012 | Newhouse et al. |
| 2012/0242656 | A1 | 9/2012 | McArdle et al. |
| 2012/0246223 | A1 | 9/2012 | Newhouse et al. |
| 2013/0038609 | A1 | 2/2013 | Tsai et al. |
| 2014/0019166 | A1 | 1/2014 | Swanson et al. |
| 2014/0092135 | A1 | 4/2014 | McArdle et al. |
| 2014/0267418 | A1 | 9/2014 | McArdle et al. |
| 2015/0070347 | A1* | 3/2015 | Hofmann .......... G06K 9/00208 345/419 |
| 2015/0097867 | A1 | 4/2015 | McArdle et al. |
| 2015/0113581 | A1 | 4/2015 | McArdle et al. |
| 2015/0201133 | A1 | 7/2015 | Newhouse et al. |
| 2015/0356788 | A1* | 12/2015 | Abe ................... A63F 13/428 345/633 |
| 2016/0262608 | A1 | 9/2016 | Krueger |
| 2017/0010469 | A1 | 1/2017 | Samec et al. |
| 2017/0193709 | A1 | 7/2017 | McArdle et al. |
| 2017/0366758 | A1 | 12/2017 | Newhouse et al. |

OTHER PUBLICATIONS

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

Hwang, Jane, Jaehoon Jung, and Gerard Jounghyun Kim, "Handheld virtual reality: a feasibility study." *Proceedings of the ACM Symposium on Virtual Reality Software and Technology*. ACM, 2006.

Duckett, Jon (2009). "Beginning HTML, XHTML, CSS, and JavaScript®," *Wrox*, p. 234.

Easypano Holdings Inc., "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.org verified date of Jul. 11, 2009, pp. 24-74.

Hewlett Packard, "HP Photosmart R717 Digital Camera with HP Instant Share User's Manual", Copyright 2005 Hewlett-Packard Development Company, L.P., downloaded from http://h10032.www1.hp.com/ctg/Manuals/c00298985.pdf on May 3, 2013, pp. 50-54.

Fauster, Loris, and T. U. Wien. "Stereoscopic techniques in computer graphics." TU Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

(56) References Cited

OTHER PUBLICATIONS

Parr62, Ben; "Easter Egg: Yelp Is the iPhone's First Augmented Reality App,"; located at https://web.archive.org/web/20090829094113/http://mashable.com/2009/08/2007/yelp-aug . . . ; Aug. 27, 2009; 10 pages.
Hildenbrand, Jerry; "Yelp 2.0 brings monocle and checkins to its Android Client,"; located at http:/www.androidcentral.com/yelp-20-brings-monocle-andcheckins-its-android-client; Jul. 5, 2010; 10 pages.
U.S. Appl. No. 14/668,915, Sep. 29, 2016, Office Action.
U.S. Appl. No. 14/044,287, Dec. 6, 2016, Notice of Allowance.
U.S. Appl. No. 14/211,786, Jan. 5, 2017, Office Action.
U.S. Appl. No. 14/668,915, Mar. 21, 2017, Notice of Allowance.
U.S. Appl. No. 14/211,786, May 3, 2017, Office Action.
U.S. Appl. No. 15/640,858, Feb. 26, 2019, Office Action.
U.S. Appl. No. 14/211,786, Jul. 17, 2019, Office Action.
U.S. Appl. No. 15/640,858, Jun. 20, 2019, Notice of Allowance.
U.S. Appl. No. 15/463,926, May 23, 2018, Notice of Allowance.
U.S. Appl. No. 15/640,858, Aug. 16, 2018, Office Action.
U.S. Appl. No. 13/269,231, Nov. 8, 2013, Office Action.
U.S. Appl. No. 13/269,231, Aug. 1, 2014, Notice of Allowance.
U.S. Appl. No. 14/533,000, Mar. 5, 2015, Office Action.
U.S. Appl. No. 14/533,000, Jun. 11, 2015, Office Action.
U.S. Appl. No. 14/533,000, Aug. 12, 2015, Notice of Allowance.
U.S. Appl. No. 13/302,964, Jun. 10, 2013, Office Action.
U.S. Appl. No. 13/302,964, Feb. 11, 2014, Office Action.
U.S. Appl. No. 13/302,964, Aug. 14, 2014, Office Action.
U.S. Appl. No. 13/302,964, Feb. 6, 2015, Office Action.
U.S. Appl. No. 13/302,964, Mar. 30, 2015, Notice of Allowance.
U.S. Appl. No. 13/302,977, May 15, 2013, Office Action.
U.S. Appl. No. 13/302,977, Aug. 14, 2014, Office Action.
U.S. Appl. No. 13/302,977, Jan. 13, 2015, Notice of Allowance.
U.S. Appl. No. 13/347,273, Apr. 23, 2014, Office Action.
U.S. Appl. No. 13/347,273, Oct. 20, 2014, Notice of Allowance.
U.S. Appl. No. 14/582,017, Jun. 19, 2015, Office Action.
U.S. Appl. No. 14/582,017, Oct. 14, 2015, Notice of Allowance.
U.S. Appl. No. 14/582,017, Nov. 6, 2015, Notice of Allowance.
U.S. Appl. No. 13/411,347, Feb. 10, 2014, Office Action.
U.S. Appl. No. 13/411,347, Oct. 21, 2014, Office Action.
U.S. Appl. No. 13/411,347, May 19, 2015, Notice of Allowance.
U.S. Appl. No. 13/410,176, Jun. 21, 2013, Office Action.
U.S. Appl. No. 13/410,176, Mar. 20, 2014, Office Action.
U.S. Appl. No. 13/410,176, Aug. 22, 2014, Office Action.
U.S. Appl. No. 13/410,176, Mar. 3, 2015, Notice of Allowance.
U.S. Appl. No. 14/044,287, Aug. 19, 2015, Office Action.
U.S. Appl. No. 14/044,287, Feb. 5, 2016, Office Action.
U.S. Appl. No. 14/044,287, Jun. 30, 2016, Office Action.
U.S. Appl. No. 14/211,786, Oct. 23, 2015, Office Action.
U.S. Appl. No. 14/211,786, Jun. 1, 2016, Office Action.
U.S. Appl. No. 15/463,926, Oct. 6, 2017, Office Action.

* cited by examiner

TECHNIQUES FOR CAPTURING AND DISPLAYING PARTIAL MOTION IN VIRTUAL OR AUGMENTED REALITY SCENES

CROSS-REFERENCES TO RELATED APPLICATIONS

The present application claims priority and benefit from U.S. Provisional Application No. 61/942,970, filed Feb. 21, 2014, entitled "METHOD FOR CAPTURING AND DISPLAYING PARTIAL MOTION IN VIRTUAL AND AUGMENTED REALITY SCENES," the entire content of which is incorporated herein by reference for all purposes.

TECHNICAL FIELD

This invention relates generally to the virtual and augmented reality, and more specifically to techniques for capturing and displaying video content that changes temporally and potentially spatially in a highlighted portion of a virtual or augmented reality (VAR) scene.

BACKGROUND

With the gaining popularity of mobile phones and mobile/tablet computers, virtual and augmented reality applications are becoming more approachable by the general public. However, as augmented and virtual realities become more widely accepted, there are numerous challenges to create an interface understandable and navigable by a wide variety of users. It can be difficult represent the moving contents of a virtual or augmented reality (VAR) scene because typical lenses found in consumer devices do not have a field of view or other means of technology to simultaneously capture an entire scene and the moving content. Additionally, representing motion in a dynamic scene can be prohibitively expensive due to bandwidth constraints. Further, since a user cannot view an entire VAR scene at once on the screen, there is a need for an animated consumption of content in a VAR scene that is focused in such a way so that the user knows where to look and can consume the animated context in a linear fashion as the author intended. This invention provides such a new and useful method for capturing and displaying VAR scenes with motion.

SUMMARY

The present disclosure relates generally to techniques for capturing and displaying partial motion in virtual or augmented reality (VAR) scenes. VAR scenes can include a plurality of images combined and oriented over any suitable geometry, including for example a spherical image disposed substantially symmetrically about a nodal point. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and, as described further below, combined with a preexisting or simultaneously captured VAR scene.

In some embodiments, the dynamic content captured by the device can be combined with a VAR scene as video content which is incorporated with the VAR scene as a "highlight" that is perpendicular to the perspective of the user (e.g., tangent to a spherical VAR scene). A highlight can be any content that varies over the time domain and which represents a subset of the VAR scene. This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

Certain embodiments relate to methods for capturing and displaying partial motion in virtual or augmented reality (VAR) scenes. A method can include capturing a first plurality of images associated with a virtual or augmented reality (VAR) scene and capturing a second plurality of images associated with a highlight of the VAR scene. Differential data can then be determined between the first plurality of images and the second plurality of images. Location and orientation data of a viewer device can be detected and the VAR scene can be rendered based on the location and orientation of the viewer device. The viewer device may receive a selection of the highlight and render the highlight within the VAR scene using the differential data.

Certain embodiments relate to services and systems for capturing and displaying partial motion in virtual or augmented reality (VAR) scenes. One example of a system can comprise a capture device and a viewer device in communication with a content management service. The content management service can store and facilitate the sharing of VAR scenes captured by a capture device with one or more viewer devices. In some embodiments, the capture device can be configured to capture a first plurality of images associated with a virtual or augmented reality (VAR) scene, capture a second plurality of images associated with a highlight of the VAR scene, and determine differential data between the first plurality of images and the second plurality of images. The viewer device can configured to detect location and orientation data of the viewer device, render the VAR scene based on the location and orientation of the viewer device, receive a selection of the highlight, and render the highlight within the VAR scene using the differential data.

The following detailed description together with the accompanying drawings will provide a better understanding of the nature and advantages of the present invention.

DETAILED DESCRIPTION

The present disclosure relates generally to techniques for capturing and displaying partial motion in virtual or augmented reality (VAR) scenes. VAR scenes can include a plurality of images combined and oriented over any suitable geometry, including for example a spherical image disposed substantially symmetrically about a nodal point. Although VAR scenes may provide an immersive view of a static scene, current systems do not generally support VAR scenes that include dynamic content (e.g., content that varies over time). Embodiments of the present invention can capture, generate, and/or share VAR scenes. This immersive, yet static, view of the VAR scene lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device and, as described further below, combined with a preexisting or simultaneously captured VAR scene.

In some embodiments, the dynamic content captured by the device can be combined with a VAR scene as video content which is incorporated with the VAR scene as a "highlight" that is perpendicular to the perspective of the user (e.g., tangent to a spherical VAR scene). A highlight can be any content that varies over the time domain and which represents a subset of the VAR scene. This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

Figure 1:
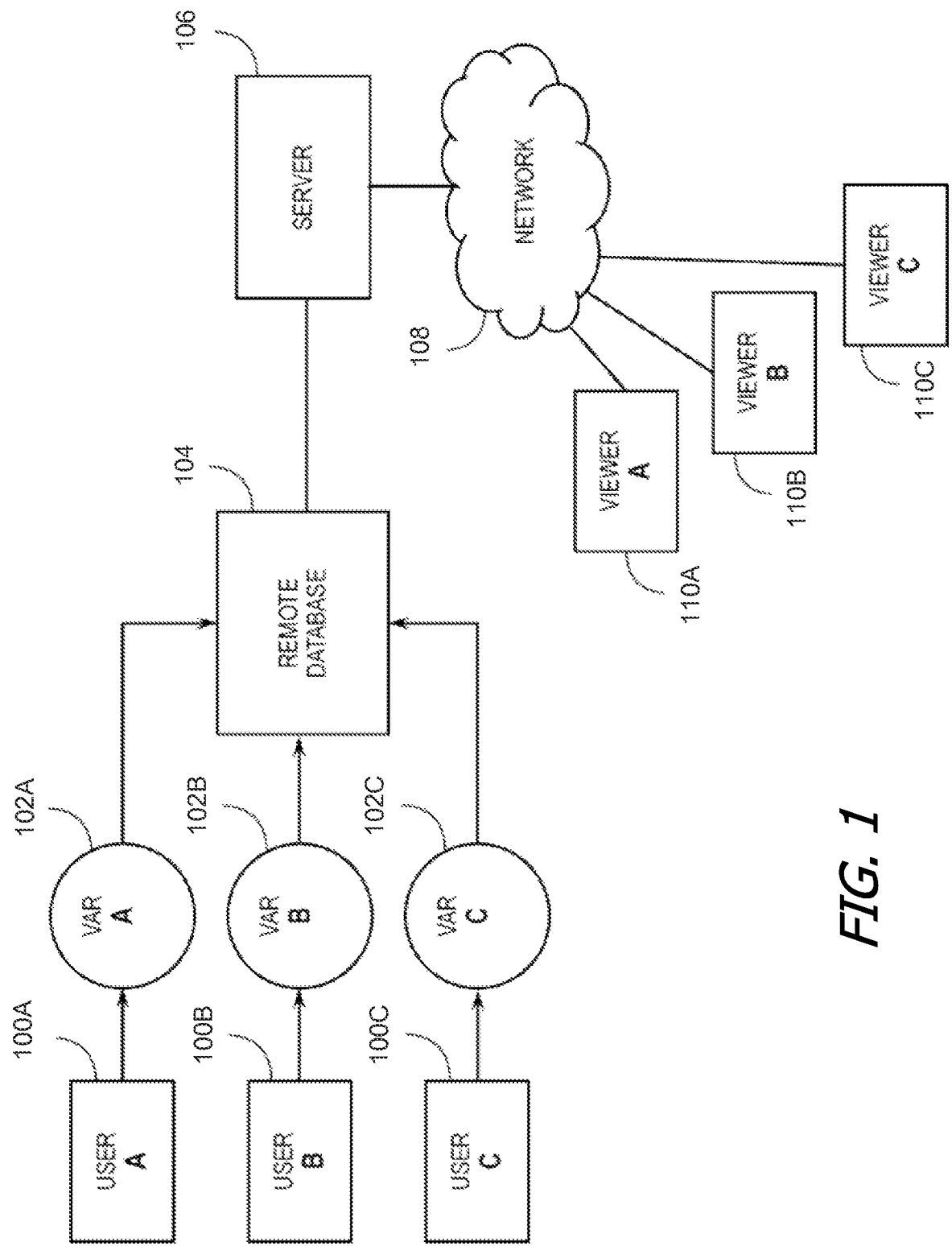
FIG. 1 shows a block diagram of a communication system, in accordance with an embodiment of the present invention.

FIG. 1 shows a block diagram of a communication system, in accordance with an embodiment of the present invention. As shown in FIG. 1, one or more user devices 100A, 100B, 100C, can be used to capture virtual or augmented reality (VAR) scenes 102A, 102B, 102C, and transmit and/or upload their respective VAR scenes 102A, 102B, 102C to a remote data store 104. The remote database 104 can be configured to include and/or be connected to a server 106 that is connectable to one or more viewer devices 110A, 110B, 110C through a network 108. In some embodiments, the server 106 can host one or more directories, files, and/or web pages containing and/or displaying the one or more VAR scenes 102A, 102B, 102C. In some embodiments, server 106 can be a server in an online content management service. The online content management service can include, for example, a file storage service, a file sharing service, a social media service that allows users to post messages and/or other content, and so on. Online content management service can communicate with one or more data stores. Online content management service can be hosted on servers maintained by a service provider and accessed via a network 108, such as the Internet. In some embodiments, online content management service can store content in one or more data sources (e.g., a database). The content can include audio, video, data, images, files, email messages, VAR scenes, and the like. In some embodiments, VAR scenes can be shared among users of the online content management service (e.g., VAR scenes from one or more capture devices 100A, 100B, 100C can be shared with one or more viewer devices 110A, 110B, 110C).

In some embodiments, a VAR scene can be generated by compositing a plurality of images captured by a capture device 100A, 100B, 100C. Compositing the plurality of images can include organizing and optionally optimizing the data for constructing a construct or data file for a spatial image scene. In some embodiments, the spatial scene can be designed for rendering with a 3D or 2D graphics platform such as OpenGL, WebGL, or Direct3D. The rendering can alternatively occur within a browser using HTML5 and/or CSS3 properties to apply appropriate transformations. In the HTML variation, HTML and CSS transforms can be used to render the VAR scene. As noted above, a VAR scene can be one that is optimally viewed with orientation/positioning parameters. For example, a viewer can explore a spherical spatial image scene on a mobile device by rotating and directing the mobile device in different directions. The displayed image on the mobile device can corresponds to the view a viewer would have seen during the capture of consecutive images. Additionally, pedometer sensing and/or GPS sensing can be used to navigate a spatial image that incorporates the user position such as walking along a path. In the HTML rendering variation, the device orientation/location/displacement is fetched (e.g., through HTML5 or a device API) and used to periodically update (e.g., 60 frames per second) the CSS transform properties of media of the virtual and augmented reality view. Exploring a spatial image scene can alternatively be achieved on a desktop or fixed device.

In some embodiments, compositing the plurality of images can occur on image capture device 100A, 100B, 100C, at remote database 104, and/or server 106. In some embodiments, the plurality of images can be stitched together using the ordering of the consecutive images and image processing to align the plurality of images. Additionally, orientation and/or location information that was collected at the image capture device while collecting the consecutive images can be used to spatially organize the images. Additionally, orientation and/or location information and image processing techniques can be cooperatively used to combine the consecutive images and assign the correct orientation to each of the plurality of images. For example, the at least two images can be stitched substantially from image processing techniques, but then assigned a global position based on a GPS signal and an orientation based on the orientation data (i.e., MEMS gyroscope, accelerometer, and the like) provided by the image capture device. In another variation of the method of an embodiment, audio and/or video data collected can additionally be mapped to particular areas of the spatial image scene. During viewing of the scene, the audio or video can be presented chronologically to show where the user was pointing while recording the media, or alternatively, presented when viewing a particular area.

In some embodiments, a user can be directed to maintain a substantially constant viewing distance between the user and the image capture device, which can function to regulate the manipulation of the image capture device during movement through the predetermined pattern. The viewing distance can be defined as the distance between the image capture device and the nodal point (e.g., the eyes of the user). The viewing distance can additionally be defined as the focal length. A substantially constant viewing distance can create a steady field of view during the traversal of the predetermined pattern and aids in the capture of a uniform scene of spatial imagery. An ideal viewing distance can additionally be standardized to be within a particular range such as between one and two feet between the image capture device and the nodal point.

In some embodiments, image capture device 100A, 100B, 100C, and methods of an embodiment can be embodied and/or implemented at least in part as a machine configured to receive a computer-readable medium storing computer-readable instructions. The instructions can be executed by computer-executable components can be integrated with device 100A, 100B, 100C, the remote database 104 and/or the server 106. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

Figure 2:
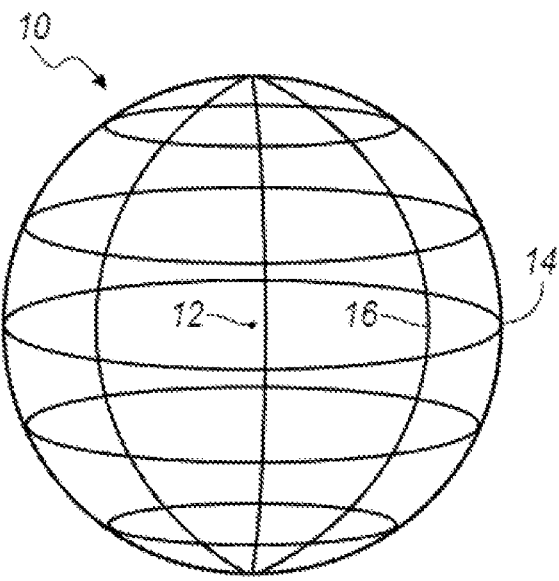
FIG. 2 shows an example of a spatial pattern used for capturing virtual or augmented reality (VAR) scenes, in accordance with an embodiment of the present invention.

FIG. 2 shows an example of a spatial pattern used for capturing virtual or augmented reality (VAR) scenes, in accordance with an embodiment of the present invention. Suitable spatial patterns can generally include multi-sided enclosed geometries and linear open geometries. As an example, the predetermined pattern can include a path, trail, map or other one-dimensional route through which the user is instructed to acquire substantially planar images. As shown in FIG. 2, one example spatial pattern can include a substantially spherical or spheroidal composite of images surrounding a nodal point 12. The spherical predetermined pattern 10 can function to permit a user and/or the image capture device to image an entire complete view of the space surrounding the nodal point 12. In some embodiments, the nodal point 12 is substantially coincident with a user, a user's head, or a portion of the user's head (i.e., a point between the user's eyes). Alternatively, the nodal point 12 can be substantially coincident with the image capture device. As shown, the spherical image 10 can define a series of latitudes 14 and a series of longitudes 16. In one variation of the method of an embodiment, the predetermined pattern can include identifying points on the spherical image 10 by latitude 14/longitude 16 coordinates at which an image should be acquired by the user. Alternatively, the predetermined pattern of an embodiment can include instructions to the user to scan a particular range of latitudes 14/longitudes 16 through each of a series of longitudes 16/latitudes 14. In some embodiments, if the predetermined pattern includes one or more images of a spherical image 10, then each of the individual images/frames can be acquired and/or processed as spherical images by the image capture device. Similarly, if the predetermined pattern includes a one-dimensional path, then each of the individual images/frames can be acquired and/or processed as planar images by the image capture device. Although embodiments are described herein with reference to a spherical pattern, other spatial patterns may also be used, such as a plane, cylinder, planar path, curved plane, or any suitable surface.

In some embodiments, a temporal pattern can be provided in addition, or as an alternative, to the spatial pattern described above. In some embodiments, the spatial pattern and/or temporal pattern can function to provide a user with a readily accessible and easily understood representation of the predetermined pattern for image acquisition. Example temporal patterns can include audible/visible cues (including musical cues) that follow a predetermined pattern indicating when and/or in what direction the user should acquire the next image/frame. In another variation of the method of an embodiment, the temporal pattern can include discrete intervals at which the user is signaled and/or instructed to capture the next image/frame in the VAR scene. Alternatively, the temporal pattern can include discrete intervals at which images/frames are automatically selected by the image capture device with or without notification to the user. As an example, if the image capture device includes a video camera, then the temporal pattern can include one or more discrete intervals that pace the acquisition of the series of frames in response to a predetermined timing, image capture device motion measurements, and/or image capture device input.

Figure 3:
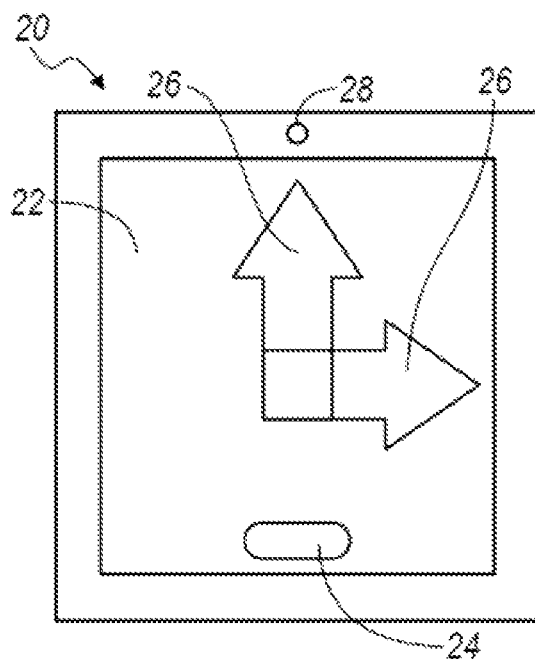
FIG. 3 shows a block diagram of a device, in accordance with an embodiment of the present invention.

FIG. 3 shows a block diagram of a device, in accordance with an embodiment of the present invention. As shown in FIG. 3, a predetermined pattern and/or user feedback in accordance with an embodiment can be presented to the user of device 20 (such as image capture device 100A, 100B, 100C) through one or more visual cues. The device 20 of an embodiment can include display 22, such as for example a touch screen display providing a user interface having one or more actuators 24, and front-facing camera 28. In the example embodiment described above, if the user is instructed to acquire images/frames composing spherical image 10, then device 20 can present a pattern/feedback through visual cues, such as arrows 26 that direct the user to move device 22 in a predetermined direction. In some embodiments, device 20 can use front facing camera 28 to determine a position of the user and/or nodal point 12, as well as to determine a proper focal/imaging distance between the user and device 20. As noted above, acquisition of spherical image 10 can include a rotation of device 20 through a range of latitudes 14 (along longitudinal arrow 26) followed by a change in longitudes 16 (i.e., pivot the device in the direction of latitudinal arrow 26).

Device 20 can include a camera, a video camera, a laptop computer, a tablet computer, a smart phone, or any other handheld or mobile device configured to acquire photos or videos. In some embodiments, device 20 can include at least one feedback channel for presenting the predetermined pattern to the user, such as for example display 22 or audio output that provides the user with the predetermined pattern and/or ongoing feedback for image acquisition. Additionally, the image capture device can include one or more embedded feedback controllers to internally control the image acquisition process in response to the orientation and/or location of the device.

Figure 4:
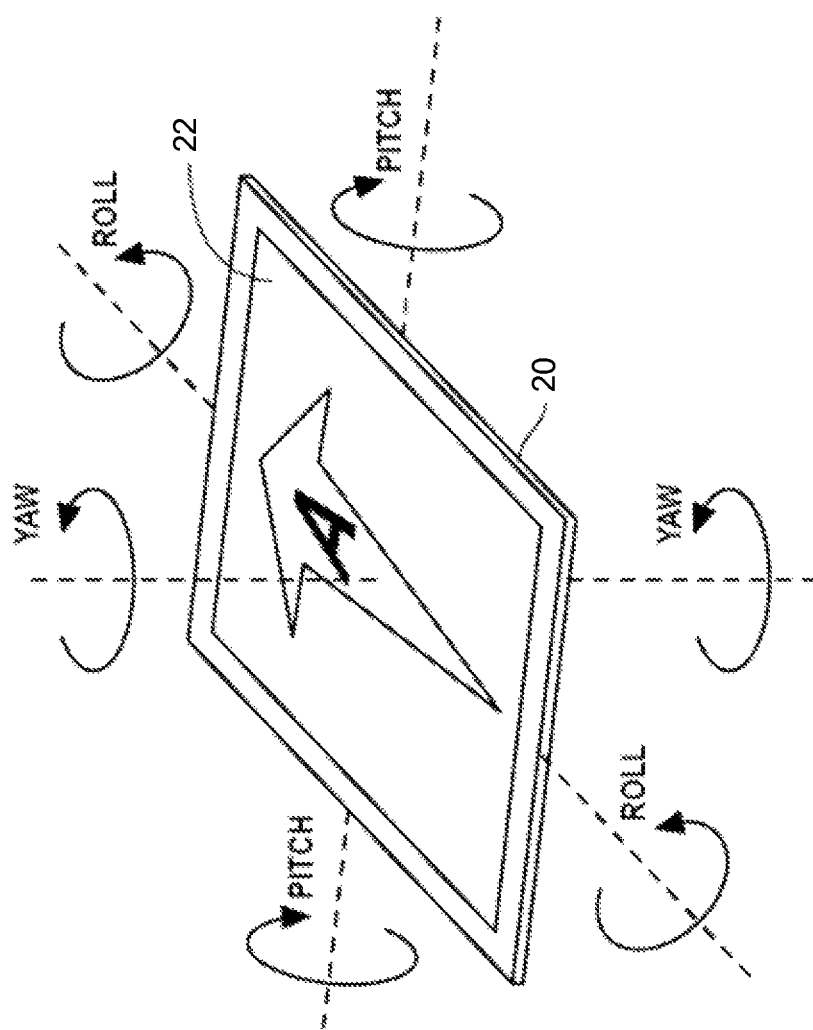
FIG. 4 shows examples of device orientations, in accordance with an embodiment of the present invention.

FIG. 4 shows examples of device orientations, in accordance with an embodiment of the present invention. As shown in FIG. 4, device 20 can be generally handled and/or oriented in three-dimensions. In some embodiments, device 20 can have a directionality conveyed by arrow A such that device 20 defines a "top" and "bottom" relative to a user holding device 20. As shown, device 20 of an embodiment can operate in a three-dimensional environment within which the apparatus can be rotated through three-degrees of freedom. In some embodiments, device 20 can be rotated about the direction of arrow A wherein the first degree of rotation is a roll value. Similarly, device 20 of an embodiment can be rotated in a first direction substantially perpendicular to the arrow A wherein the second degree of rotation is a pitch value. Further, device 20 of an embodiment can be rotated in a second direction substantially mutually orthogonal to the roll and pitch plane, wherein the third degree of rotation is a yaw value. The orientation of device 20 of an embodiment can be at least partially determined by a combination of its roll, pitch, and yaw values.

In some embodiments, device 20 can be configured to determine its own orientation in three-dimensional space. For example, device 20 can include one or more modules or sensors for detecting, determining, calculating, and/or providing a projection matrix, which is a mathematical representation of an arbitrary orientation of a three-dimensional object having three degrees of freedom relative to a second frame of reference. As an example, the projection matrix can include a mathematical representation of a device's orientation in terms of its Euler angles (pitch, roll, yaw) in any suitable coordinate system. In some embodiments, the image capture device can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating the projection matrix and/or the associated Euler angles. Orientation and/or position information can be gathered in any suitable fashion, including device Application Programming Interfaces (API) or through any suitable API exposing device information, e.g., using HTML5 to expose device information including orientation/location.

Figure 5:
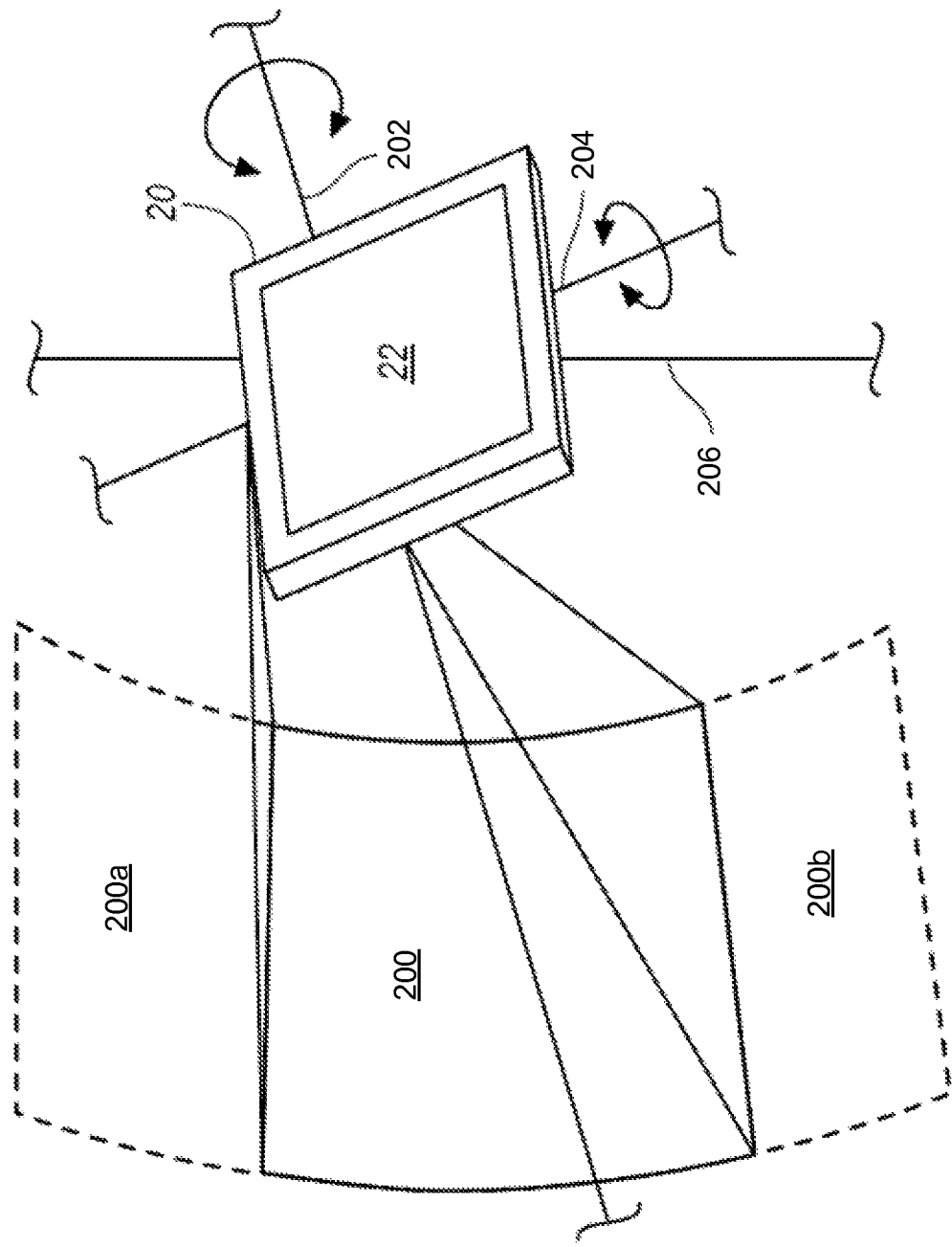
FIG. 5 shows an example of capturing a VAR scene using a predetermined pattern, in accordance with an embodiment of the present invention.

FIG. 5 shows an example of capturing a VAR scene using a predetermined pattern, in accordance with an embodiment of the present invention. As shown in FIG. 5, the predetermined pattern of the method of an embodiment can include instructions for orienting device 20 about one or more discrete axes 202, 204, 206. In some embodiments, the instructions can be presented to the user through display 22 of device 20, although other suitable tactile and/or audio instructions can be communicated in addition to or in lieu of visible instructions. As shown in FIG. 5, device 20 can be rotated through a series of pitch values about axis 202 to capture a series of discrete images/frames 200, 200A, 200B. In some embodiments, device 20 can additionally and/or subsequently be rotated through a series of roll values along axis 206 for each series of images/frames captured 200, 200A, 200B. Acquisition of a sufficient range of pitch values and roll values can result in the collection of an entire spherical image 10 of the type described above. Alternatively, if device 20 is equipped with front-facing and rear-facing cameras, then the sufficient range of pitch values and roll values can be divided in half, as device 20 can capture opposing segments of hemispherical images at each acquisition. In another variation of the method of an embodiment, the front-facing and rear-facing cameras can be configured with customized settings (i.e., exposure settings) such that each camera functions to supplement the other resulting in additional image data being collected for each view within spherical image 10. In some embodiments, a user maintains device 20 substantially still along axis 206 and rotates device 20 about axis 206 during the image acquisition to ensure consistent and symmetrical image acquisition. Accordingly, device 20 can include one or more positioning functions, such as global position satellite capabilities, WiFi triangulation capabilities, and/or mobile telephone triangulation capabilities, in order to assist the user in maintaining device 20 substantially along axis 206 during the acquisition process.

In some embodiments, if the image capture mechanism is still photography, then the acquisition of the at least one image is substantially simultaneous with a user input, such as a tactile input or audio command. Alternatively, if the image capture mechanism is video photography, then the acquisition of the at least one image can continue for a duration following the user input. In another alternative, the acquisition of the at least one image can be initiated in response to a predetermined orientation/location condition of the image capture device, such that if the user positions/moves the image capture device in a predetermined fashion, the image capture device will automatically acquire the image. In another alternative, the image capture mechanism can include both still photography and video photography portions, in which case the image acquisition process can respond as necessitated by the requirements of the image capture device. Another variation of the method of an embodiment can include acquiring a second image that substantially replicates a prior acquired image. In some embodiments, the second image acquisition can be performed in response to determining a low quality in the prior acquired image. Image quality can be determined at the image capture device, or alternatively at a remote database or server during a subsequent image processing phase.

In some embodiments, as discrete images/frames 200, 200A, 200B are captured, the user can be provided with feedback to ensure a complete acquisition of the VAR scene. For example, instructions can be provided with the spatial or temporal patterns described above to guide, teach, instruct, and/or cause a user to acquire any subsequent images in accordance with the predetermined pattern so as to ensure completion of the complete VAR scene. In some embodiments, the feedback can include at least one of user-oriented feedback or device-oriented feedback. User-oriented feedback can include for example visual, tactile, or audio feedback to communicate corrective suggestions to the user during the image acquisition sequence. As an example, user-oriented feedback can include distorting a display and/or audio feed during motion of the device such that a user is prompted to wait until there is a clear image, written instruction, sound, and/or the like prior to capturing the intended image/frame. In some embodiments, acceleration of the device can be determined by any suitable sensor, such as the one or more cameras (front/rear), an accelerometer, a gyroscope, a MEMS gyroscope, a magnetometer, a pedometer, a proximity sensor, an infrared sensor, an ultrasound sensor. In response to a device acceleration/motion, the device can provide user-oriented feedback to the user in order to get the user to manage the device motion and improve the capture of the VAR scene.

In some embodiments, device-oriented feedback can include for example automated control of the timing, sequencing, and selection of captured still images/video frames based on one or more predetermined factors. In some embodiments, both user-oriented and device-oriented feedback is provided to the user. Alternatively, the device-oriented feedback can be directed to the image capture device with or without the user's knowledge. In some embodiments, the user-oriented feedback can be combined with one or more aspects of the predetermined pattern to provide the user with a continuous input-feedback loop relating to the acquisition of the VAR scene such that the user does not stray or (per the device's action) is unable to stray from the predetermined pattern.

As noted above, the image capture device can include one or more cameras (front/rear), an accelerometer, a gyroscope, a MEMS gyroscope, a magnetometer, a pedometer, a proximity sensor, an infrared sensor, an ultrasound sensor—all or any of which can be used to determine an acceleration/motion of the image capture device through the predetermined pattern. Device-oriented feedback can be initiated in response to a sensor determination and/or a context of the predetermined pattern (i.e., whether a sudden acceleration of the device proper at a particular point in the acquisition process.) In some embodiments, the method of an embodiment provides device-oriented feedback in response to an improper/non-ideal handling of the image capture device for a predetermined portion (context) of the predetermined pattern. Device-oriented feedback can automate the selection of video frames and/or the actuation of capturing still images, in response to one or more predetermined conditions relating to the motion of the image capture device and/or the context of the predetermined pattern.

As an example, device-oriented feedback can control the selection of video frames and/or the actuation of capturing still images in response to one or more of: an angular/linear distance between the present location of the image capture device and the last captured/selected image/frame; an angular/linear distance between the present location of the image capture device and any other arbitrary previously captured/selected image/frame in the predetermined pattern; a time since the last captured/selected image/frame; an exposure difference measured from the last captured/selected image/frame; a current exposure level; an angular velocity of the image capture device; a shutter speed of the one or more cameras of the image capture device; a camera gain; a distance to any discrete guide point and/or guide region in the predetermined pattern and/or location of interest; a product of the angular velocity of the image capture device (average/current) and the shutter speed of the one or more cameras of the image capture device; and/or any explicit instruction from the user indicating a relative importance of the frame/image currently capturable by the image capture device. Alternatively, the device-oriented feedback can include any other usable measurements of the image capture device orientation and/or location, or any other suitable parameter relating to qualitative and/or quantitative aspects of the image sought.

Figure 6:
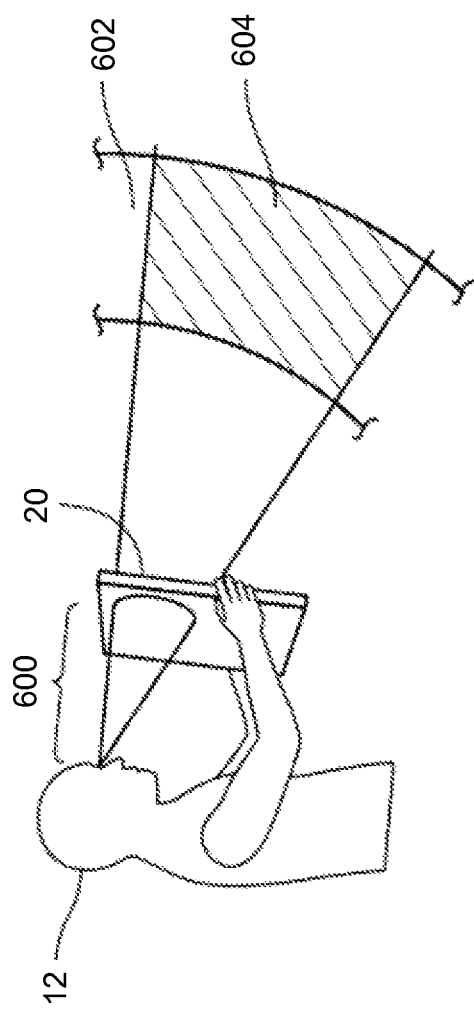
FIG. 6 shows an example of viewing a VAR scene, in accordance with an embodiment of the present invention.

FIG. 6 shows an example of viewing a VAR scene, in accordance with an embodiment of the present invention. As shown in FIG. 6, in some embodiments device 20 can be used to view a VAR scene, such as spherical image 602. In some embodiments, the portion of the spherical image (e.g., VAR scene 604) that is displayable by device 20 corresponds to an overlap between a viewing frustum of the device (e.g., a viewing cone projected from device 20) and spherical image 602. VAR scene 604 can be a portion of spherical image 602, which can include a substantially rectangular display of a concave, convex, or hyperbolic rectangular portion of the sphere of spherical image 602. In some embodiments, nodal point 12 is disposed at a distance 600 approximately the origin of the spherical image 602, such that a viewer located at nodal point 12 has the illusion of being located at the center of a larger sphere or bubble having VAR scene 604 displayed on its interior. Alternatively, nodal point 12 can be disposed at any other suitable vantage point within spherical image 602 displayable by device 20. In another alternative, the displayable scene can include a substantially planar and/or ribbon-like geometry from which the nodal point is distanced in a constant or variable fashion. In some embodiments, the display of VAR scene 604 can be performed within a 3D or 2D graphics platform such as OpenGL, WebGL, or Direct 3D. Alternatively, the display of scene 604 can be performed within a browser environment using one or more of HTML5, CSS3, or any other suitable markup language. In another variation of the device 20 of an embodiment, the geometry of the displayable scene can be altered and/or varied in response to an automated input and/or in response to a user input.

In some embodiments, as described further below, device 20 can include processor 70 which can be configured to adapt VAR scene 604 displayable on the device 20 to the user in response to a change in the orientation of device 20 and/or the orientation of nodal point 12 relative to device 20. Processor 70 can function to alter, change, reconfigure, recompute, regenerate, and/or adapt the displayable scene in response to a change in the orientation of device 20 and/or the orientation of nodal point 12 relative to device 20 to create a uniform and immersive user experience by adapting the displayable scene consistent with movement of device 20 relative to the projection matrix and/or relative to nodal point 12. In some embodiments, adapting the displayable scene can include at least one of processor 70 adjusting a virtual zoom of the scene, processor 70 adjusting a virtual parallax of the scene, processor 70 adjusting a virtual perspective of the scene, and/or processor 70 adjusting a virtual origin of the scene. Alternatively, or additionally, adapting the displayable scene can include any suitable combination of the foregoing, performed by processor 70 of an embodiment substantially serially or substantially simultaneously, in response to a timing of any determined change in the orientation of device 20 and/or the orientation of nodal point 12 relative to device 20.

Figure 7:
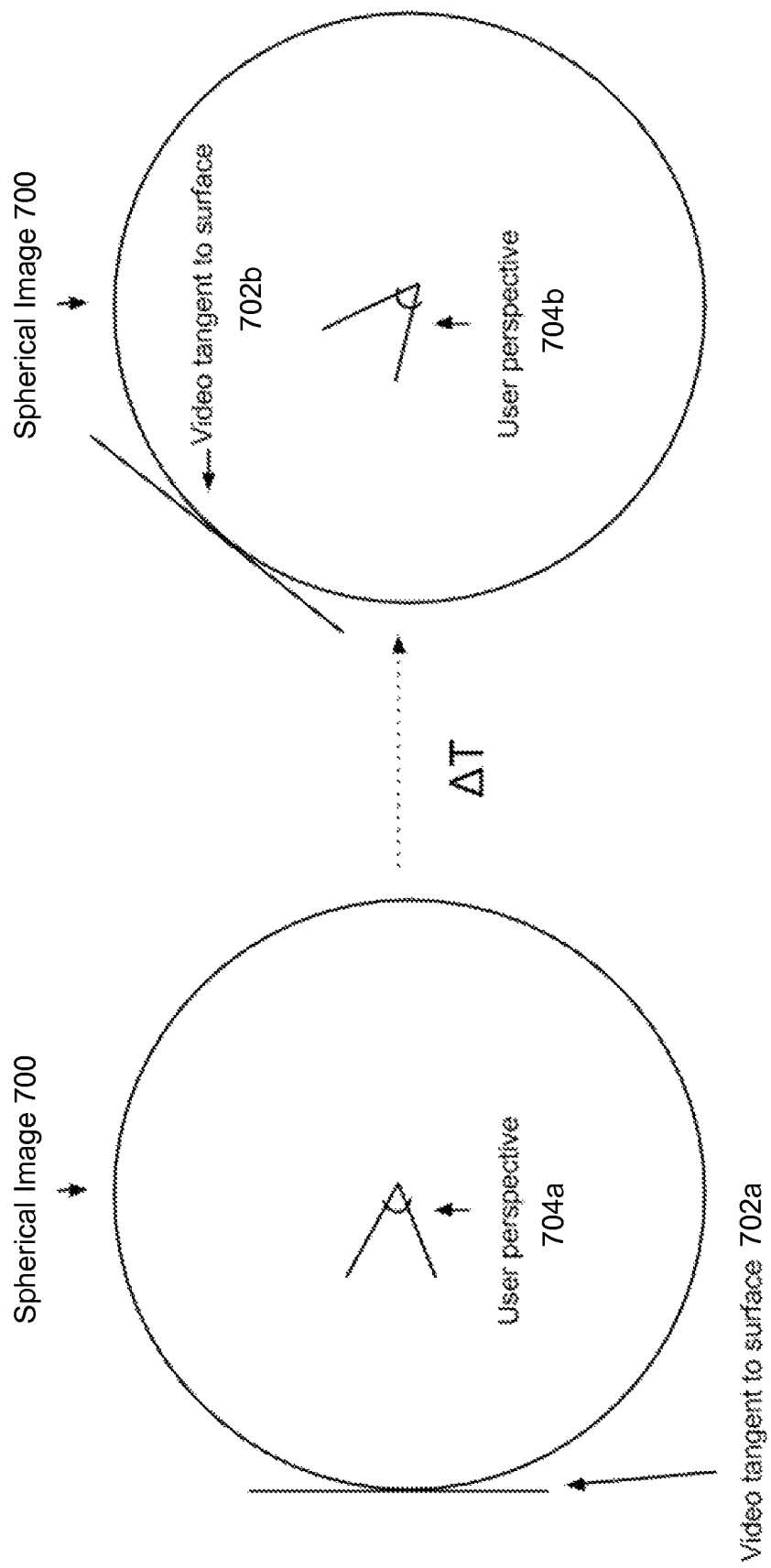
FIG. 7 shows an example of combining a dynamic portion of a VAR scene with a static portion of a VAR scene, in accordance with an embodiment of the present invention.

FIG. 7 shows an example of combining a dynamic portion of a VAR scene with a static portion of a VAR scene, in accordance with an embodiment of the present invention. As described above, device 20 can capture, generate, and/or share VAR scenes. These VAR scenes generally include a plurality of static images that are combined to form a VAR scene, such as spherical image 700. This can produce an immersive, yet static, view of the VAR scene which lacks dynamic content (e.g., content which varies over time). Embodiments of the present invention can efficiently add dynamic content to the VAR scene, allowing VAR scenes including dynamic content to be uploaded, shared, or otherwise transmitted without prohibitive resource requirements. Dynamic content can be captured by device 20 and, as described further below, combined with a preexisting or simultaneously captured VAR scene.

In some embodiments, the dynamic content captured by the device can be combined with spherical image 700 as video content 702a which is incorporated with spherical image 700 such that video content 702a is tangent to spherical image 700 as a "highlight". A highlight can be any content that varies over the time domain and which represents a subset of the VAR scene (e.g., spherical image 700). This can include a video that may or may not include depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and/or spatial domains can be used.

As shown in FIG. 7, the dynamic content can include a plurality of frames which can be combined at multiple locations tangent to spherical image 700. Thus, the highlight may move around spherical image 700, while staying perpendicular to the perspective of the user 704a, 704b over time (e.g., the surface normal is aligned with the center of the projection) such that the motion, if isolated within the frame, is perceived as a seamless motion inside the spherical image 700.

Figure 8:
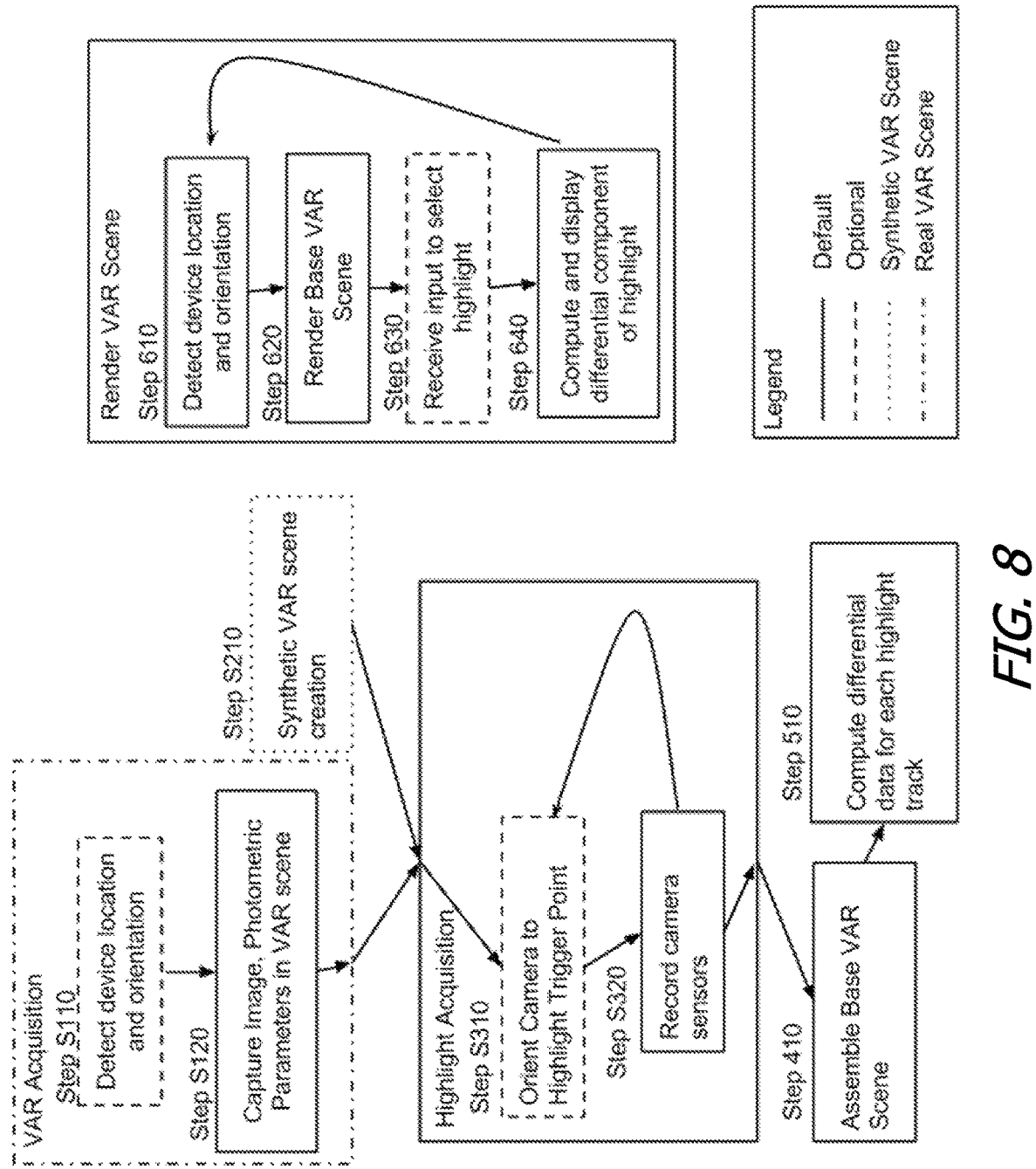
FIG. 8 is a flow diagram of a process of displaying partial motion in virtual and augmented reality scenes, in accordance with an embodiment of the invention.

FIG. 8 is a flow diagram of a process of displaying partial motion in virtual and augmented reality scenes, in accordance with an embodiment of the invention. As shown in FIG. 8, at block S110 the method of an embodiment includes first determining the device location and orientation of the device according to a chosen reference frame, at block S120 next capturing image (optical, depth or other features), photometric parameters and location of the VAR scene, or at block S210 optionally creating of a synthetic VAR scene.

Next, in some embodiments, at block S310 the method includes steps to acquire highlighted, or partial, components of the VAR scene in a dynamic (changing through time) dimension, beginning with optionally orienting the camera or device to highlight the trigger point for consumption or playback and then, at block S320, recording camera sensors through time until the user has completed acquisition of the highlight (e.g., the dynamic portions) of the VAR scene, or is ready to add an additional highlight.

In some embodiments, at block 410 the method includes steps to assemble the base VAR scene depending on the acquired inputs and types of data and then, at block 510, computing differential data for each highlight track through time so such that playback when paused results in a coherent static VAR scene.

In some embodiments, once the VAR scene has been captured and the highlight has been acquired, the display of the VAR scene can include detecting the device location and orientation through an IMU, camera, or other sensor (block S610), computing a consistent reconstruction of the VAR scene given the location and orientation of the VAR scene (block S620), starting or pausing the playback of a highlight based on user input or a trigger based on the user's orientation or location within the VAR scene (block S630), and then finally computing and displaying the differential component of the highlight relative to the rest of the VAR scene (block S640).

In some embodiments, the virtual and augmented reality scene may include of a 3D model, a partially or wholly spherical photo, digitally generated environment map, and/or other suitable model presentable in 3D space.

In some embodiments, an image can be approximated as being the result of a function which takes in intrinsic properties of a scene—such as, but not limited to, the objects in the scene, their reflectivity and radiosity, atmospheric effects, etc.—and combines them with photometric parameters such as, but not limited to, exposure, white balance, etc. to produce a resulting image. This image can be defined in terms of optical properties, depth, or any other suitable measurable quantity that varies across a scene.

In some embodiments, a highlight can be approximated as content that varies over the time domain and represents a subset of the VAR scene. This can include a video that may or may not contain depth information that can be layered on top of a 3D model or in perpendicular to the user's rays of projection to provide a "billboarding" effect which is one of a seamless experience without distortion in the context of a VAR scene represented by a spherical photograph. Any suitable content that varies over time and spatial domains is appropriate.

As shown in FIG. 8, block S110, which includes detecting orientation of a computing device functions to determine the orientation of the computing device. The computing device can include an inertial measurement unit (IMU) that can include a 3-axis magnetometer, a 3-axis accelerometer, or a 3-axis gyroscope. The IMU may alternatively include any suitable combination of the above components or a single or double axis sensor or any suitable sensor combination to detect orientation. Additionally, block S110 may include detecting positioning location, which can provide another parameter for determining orientation and position. A global positioning system (GPS) can be used to determine geographical location. Orientation information may be gathered in any suitable manner including device API's or through any suitable API exposing device orientation information such as using HTML5 to access device orientation or CoreMotion on an iOS platform or the equivalent on Android and Windows platforms. An imaging system may additionally be used to perform image processing on the surrounding environment. In some embodiments the image system is a forward or backward facing camera that can be used to determine the position of a user looking at the computing device. In the case where there are no suitable sensors, this step may represent the device orientation as the identity orientation.

Block S120 can include capturing a VAR scene using a combination of different sensor inputs required to construct a VAR scene. These may be a combination of orientation and image pairs used to construct a spherical or panoramic photograph or a combination of images, IMU readings and depth readings to construct a 3D model. Any suitable representation that produces a navigable VAR scene is appropriate.

Block S210 can include artificially constructing a VAR scene that can be augmented by a set of captured highlights. These may be either a spherical photograph, 3D model, or any other suitable data representation of a VAR scene.

Block S310 can include specifying a point in which the VAR scene at which point the user consuming the final composite would like to view the given highlight. This can be either the starting orientation and location when the user begins recording a highlight or a point at which the user marks during the capture of the highlight.

Block S320 can include recording the camera sensors and store them along the time domain. In some embodiments, this includes any standard video format (such as, but not limited to, h264, AVI, MPEG) combined with metadata representing the orientation and optionally translation in a scene.

Block 410 can include assembling the captured VAR scene into a static base VAR scene that can be augmented with the dynamic highlights. In some embodiments, this includes combining images and orientations into a spherical photograph. In another implementation, this may include combining images, orientations, translations and depth readings into a 3D model. Additionally, one may combine the data captured in S120, S210 and S320 to create a static VAR scene that when viewed with the highlights provides a seamless start and stop transition at the beginning and end of the playback. As an example, if a highlight is focusing on someone talking at a dinner table, the static VAR scene may be a frame chosen such that the start frame of a highlight is used at the base location in a static VAR scene so that there is no visual "skipping" during highlight playback. Any suitable implementation that constructs a static VAR scene is permissible.

Block S510 can include computing differential temporal data for each highlight track. In some embodiments, for a VAR scene represented as a spherical panorama, this may include aligning each individual frame from a video highlight along the base VAR scene. This may be done using interest point matching, combined with RANSAC or any suitable means to approximate the location of the objects in the camera so that the highlight and the VAR scene appear as one coherent scene at any given point in time. In some embodiments, this may include a direct placement of the rectangle of the video in over the portion of the VAR scene it applied to. Another may provide a Gaussian mask to help blend the two components together into a coherent scene. Another method may use a more sophisticated form of blending such as poisson blending or seaming such as a suitable graph-cut method. Any suitable means of interpolating the highlight data into the VAR scene is permissible.

Block S610 can be substantially equivalent to S110 in detecting the device location and orientation. This can optionally include specifying a synthetic location and orientation or offset such that the user is not required to use their motion to explore the VAR scene.

Block S620 can include displaying a VAR scene according to the desired parameters. In some embodiments, this includes a stereo pair of spherical photos that are rendered for each eye on a device. Any suitable representation is appropriate.

Block S630 can include beginning playback of a highlight based on the sensor and/or location inputs from S610. In some embodiments, this may include, but is not limited to, beginning playback when the center vector of the projection intersects with the video frame of the first frame of a highlight. In another implementation, this is a button in the user interface that begins and/or controls playback.

Block S640 can include playing back the pre-computed differential data in S510 in the VAR scene. In some embodiments, this may include, but is not limited to, a video combined with temporal orientation and location used to transform the playback rectangle combined with an alpha mask defined in an additional track, channel, or any other suitable format so that at any point in time the highlight appears a coherent part of the VAR scene. In the aforementioned implementation wherein the VAR scene is represented by a spherical photo, because the surface normals of the imagery are aligned with the center projection vector of the viewer, if there is no perceptible border between the VAR scene and the highlight the composite will be geometrically consistent. In some scenarios, it may make sense to temporarily adapt the VAR scene to be consistent with the highlight, for example poisson blending is often done from both sides of an image border. Any suitable playback method, for example involving a video with a 3D depth map, a stereo pair, or a fully defined animation is appropriate when combined with the base static VAR scene.

As discussed further below with respect to FIG. 10, the (capture and/or viewer mobile) device 20 of an embodiment can include a display 22, an orientation module 50 including a real orientation module and a user orientation module, a location module 60, a camera 90 oriented in substantially the same direction as the display 22, and a processor 70 connected to each of the display, orientation module 50, location module 60, and camera 90. The device 14 of an embodiment can function to capture and/or present a virtual and/or augmented reality (VAR) scene to a user from the point of view of a nodal point or center thereof, such that it appears to the user that he or she is viewing the world (represented by the VAR scene) through a frame of a window. The device 20 of an embodiment can include any suitable type of mobile computing apparatus such as a smart phone, a personal computer, a laptop computer, a tablet computer, a television/monitor paired with a separate handheld orientation/location apparatus, or any suitable combination thereof.

Figure 9:
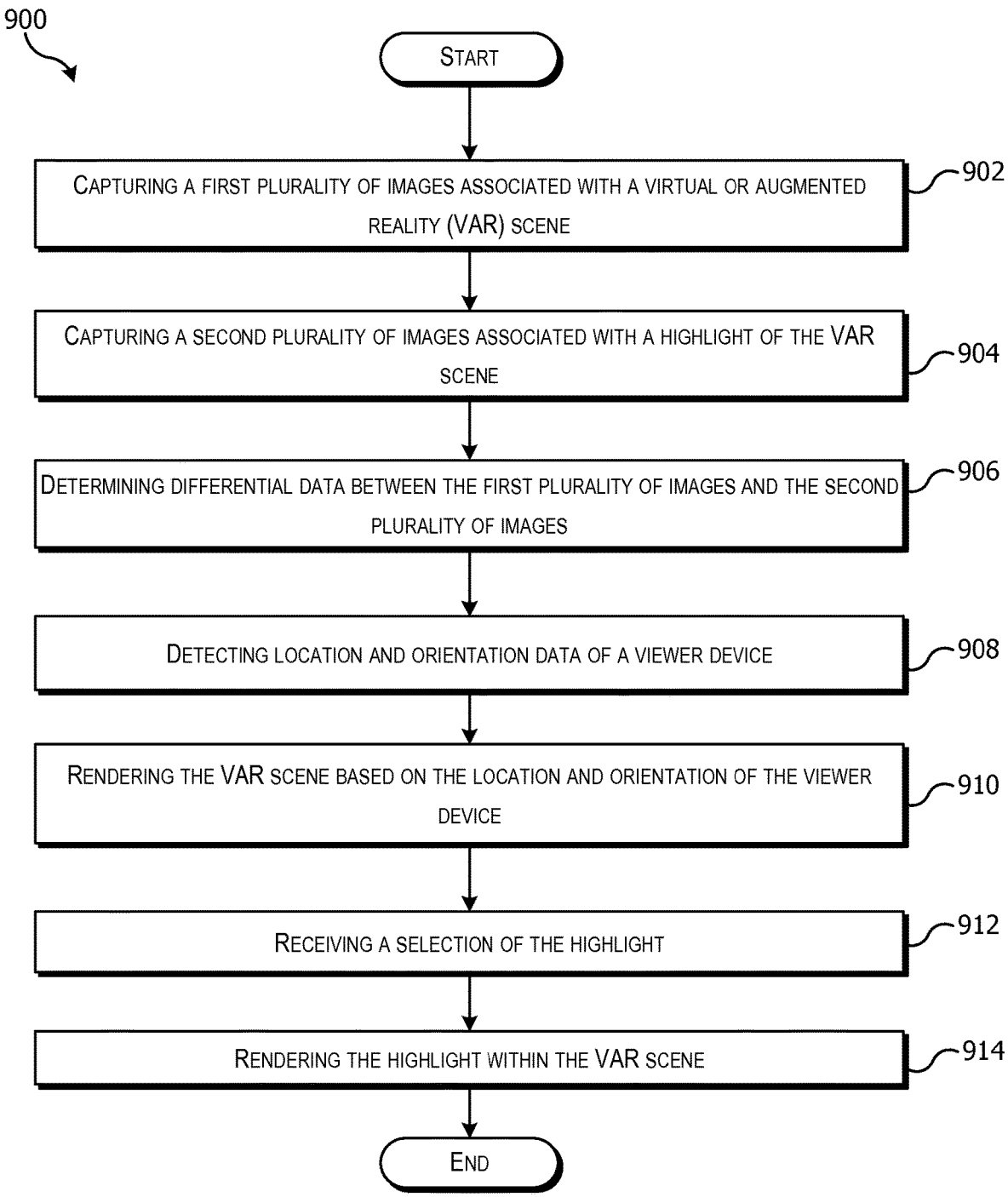
FIG. 9 is a flow diagram of a process of displaying partial motion in virtual and augmented reality scenes, in accordance with an embodiment of the present invention.

FIG. 9 is a flow diagram of a process 900 for managing calendar invites according to an embodiment of the present invention. Process 900 can be performed by an online content management service, capture device or viewer device, as described above.

At block 902, a first plurality of images associated with a virtual or augmented reality (VAR) scene can be captured. As described above, device 20 can capture the first plurality of images using a camera, video camera, or other component. In some embodiments, device 20 can display a spatial pattern to guide the user while capturing the first plurality of images. In some embodiments, capturing the first plurality of images can include detecting location and orientation data of a capture device, and associating each image of the first plurality of images with the location and orientation data detected when that image is captured. The orientation data may be used to combine the first plurality of images into the VAR scene.

At block 904, a second plurality of images associated with a highlight of the VAR scene can be captured. In some embodiments, the capturing the second plurality of images can include receiving a selection to capture the second plurality of images with the device in a starting location and orientation. During capture, location and orientation data of a capture device can be detected and associated the location and orientation data of the capture device over time during capture of the second plurality of images.

At block 906, differential data between the first plurality of images and the second plurality of images can be determined. In some embodiments, as described above determining differential data can include aligning each individual frame from a video highlight along the base VAR scene using, e.g., interest point matching, combined with RANSAC or any suitable means to approximate the location of the objects in the camera so that the highlight and the VAR scene appear as one coherent scene at any given point in time.

At block 908, location and orientation data of a viewer device can be detected. Location and orientation data can be determined using an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any combination thereof.

At block 910, the VAR scene can be rendered based on the location and orientation of the viewer device. In some embodiments, rendering the VAR scene can include assembling the first plurality of images into a spherical VAR scene based on the detected location and orientation data associated with each image of the first plurality of images, and overlaying at least one image from the second plurality of images on the spherical VAR scene based on the location and orientation data associated with the at least one image from the second plurality of images. In some embodiments, overlaying at least one image from the second plurality of images on the spherical VAR scene can include blending the at least one image from the second plurality of images with the spherical VAR scene.

At block 912, a selection of the highlight can be received at the viewer device. At block 914, the selected highlight can be rendered within the VAR scene using the differential data. In some embodiments, the VAR scene comprises a static base VAR scene and the highlight of the VAR scene which represents a portion of the VAR scene and varies with time.

In some embodiments, blending can include one or more of direct placement, blending using a Gaussian mask, poisson blending, and seaming.

It will be appreciated that process 900 is illustrative and that variations and modifications are possible. Steps described as sequential can be executed in parallel, order of steps can be varied, and steps can be modified, combined, added or omitted. The processes can be performed by various computer systems, including a client computer system (e.g., a capture device or a viewer device), and/or a server computer system of an online content management service. In some embodiments, different portions of the processes can be performed by different computer systems.

While the invention has been described with respect to specific embodiments, one skilled in the art will recognize that numerous modifications are possible. For example, while the description above can make reference to email, the invention can be applied to any type of electronic message that can be stored and managed.

Figure 10:
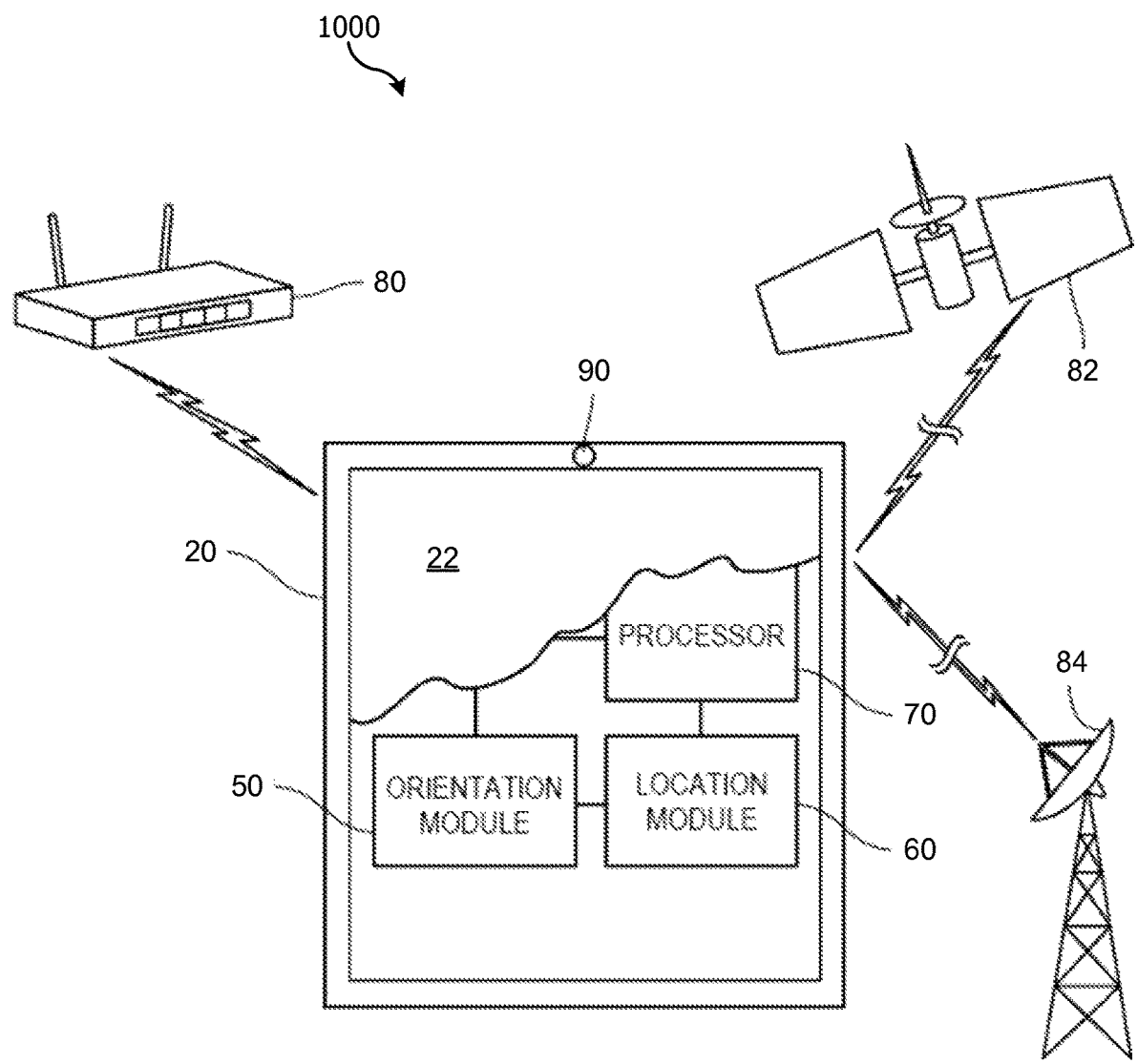
FIG. 10 shows a simplified block diagram of a representative computer system that can be used in an embodiment of the present invention.

FIG. 10 shows a simplified block diagram of a representative computer system 1000 that can be used in an embodiment of the present invention. As shown in FIG. 10, orientation module 50 of device 20 of an embodiment includes at least a real orientation portion and a user orientation portion. The real orientation portion of orientation module 50 provides a frame of reference for device 20 as it relates to a world around it, wherein the world around can include real three dimensional space, a virtual reality space, an augmented reality space, or any suitable combination thereof. As noted below, the projection matrix can include a mathematical representation of an arbitrary orientation of a three-dimensional object (i.e., device 20) having three degrees of freedom relative to a second frame of reference. As noted in the examples below, the projection matrix can include a mathematical representation of device 20 orientations in terms of its Euler angles (pitch, roll, yaw) in any suitable coordinate system.

In one variation of device 20 of an embodiment, the second frame of reference can include a three-dimensional external frame of reference (i.e., real space) in which the gravitational force defines baseline directionality for the relevant coordinate system against which the absolute orientation of device 20 can be measured. In such an example implementation, device 20 will have certain orientations corresponding to real world orientations, such as up and down, and further such that device 20 can be rolled, pitched, and/or yawed within the external frame of reference. In some embodiments, orientation module 50 can include a MEMS gyroscope configured to calculate and/or determine a projection matrix indicative of the orientation of device 20. In one example configuration, the MEMS gyroscope can be integral with orientation module 50. Alternatively, the MEMS gyroscope can be integrated into any other suitable portion of device 20 or maintained as a discrete module of its own.

As shown in FIG. 10, the user orientation portion of orientation module 50 can function to provide a frame of reference for device 20 relative to a point or object in space, including a point or object in real space. In some embodiments, the user orientation can include a measurement of a distance and/or rotational value/s of the device relative to a nodal point. In another variation of device 20 of an embodiment, the nodal point can include a user's head such that the user orientation includes a measurement of the relative distance and/or rotational value/s of device 20 relative to a user's field of view. Alternatively, the nodal point can include a portion of the user's head, such as for example a point between the user's eyes. In another alternative, the nodal point can include any other suitable point in space, including for example any arbitrary point such as an inanimate object, a group of users, a landmark, a location, a waypoint, a predetermined coordinate, and the like. As shown above in FIG. 10, in some embodiments the user orientation portion of orientation module 50 can function to create a viewing relationship between a viewer (optionally located at nodal point 12) and device 20, such that a change in user orientation can cause a consummate change in viewable content consistent with the user's VAR interaction, i.e., such that the user's view through the frame will be adjusted consistent with the user's orientation relative to the frame.

As shown in FIG. 10, one variation of device 20 of an embodiment includes location module 60 connected to processor 70 and orientation module 50. Location module 60 of an embodiment functions to determine a location of device 20. As noted above, location can refer to a geographic location, which can be indoors, outdoors, above ground, below ground, in the air or on board an aircraft or other vehicle. In some embodiments, as shown in FIG. 10, device 20 of an embodiment can be connectable, either through wired or wireless means, to one or more of satellite positioning system 82, a local area network or wide area network such as WiFi network 80, and/or cellular communication network 84. A suitable satellite position system 82 can include for example the Global Positioning System (GPS) constellation of satellites, Galileo, GLONASS, or any other suitable territorial or national satellite positioning system. In one alternative embodiment, location module 60 of an embodiment can include a GPS transceiver, although any other type of transceiver for satellite-based location services can be employed in lieu of or in addition to a GPS transceiver.

Processor 70 of device 20 of an embodiment functions to manage the presentation of the VAR scene to the viewer. In some embodiments, processor 70 can function to display a scene to the viewer 12 on display 22 in response to the real orientation and the user orientation. Processor 70 of an embodiment can be configured to process, compute, calculate, determine, and/or create a VAR scene that can be displayed on device 20 to a viewer, wherein the VAR scene is oriented to mimic the effect of the viewer viewing the VAR scene as if through the frame of the device 20. In some embodiments, orienting the scene can include preparing a VAR scene for display such that the viewable scene matches what the user would view in a real three-dimensional view, that is, such that the displayable scene provides a simulation of real viewable space to the viewer as if device 20 were a transparent frame. As noted above, the scene is can be a VAR scene; therefore it can include one or more virtual and/or augmented reality elements composing, in addition to, and/or or in lieu of one or more real elements (buildings, roads, landmarks, and the like, either real or fictitious). Alternatively, the scene can include processed or unprocessed images/videos/multimedia files of one or more displayable scene aspects, including both actual and fictitious elements as noted above.

It will be appreciated that computer system 1000 is illustrative and that variations and modifications are possible. Computer system 1000 can have other capabilities not specifically described here (e.g., mobile phone, global positioning system (GPS), power management, one or more cameras, various connection ports for connecting external devices or accessories, etc.). Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

What is claimed is:

1. A method comprising:
generating a virtual or augmented reality (VAR) scene based on a first plurality of images captured by a camera of a device;
generating dynamic content for a portion of the VAR scene, the dynamic content comprising a second plurality of images captured by the camera of the device;
detecting a first orientation of the device;
based on detecting the first orientation of the device, presenting a first view of the VAR scene on the device;
detecting a second orientation of the device; and
based on detecting the second orientation of the device, presenting a second view of the VAR scene comprising the dynamic content overlaid over the portion of the VAR scene by overlaying at least one image from the second plurality of images on at least one image from the first plurality of images and varying the at least one image from the second plurality of images.

2. The method of claim 1, wherein varying the at least one image from the second plurality of images comprises varying the at least one image over a spatial domain within the VAR scene.

3. The method of claim 1, further comprising, before generating the VAR scene based on the first plurality of images captured by the camera of the device, capturing the first plurality of images by:
detecting location and orientation data of the device; and
associating each image of the first plurality of images with the location and orientation data detected when that image is captured.

4. The method of claim 3, further comprising, before generating the dynamic content for the portion of the VAR scene, capturing the second plurality of images by:
receiving a selection to capture the second plurality of images with the device in a starting location and orientation;
detecting additional location and orientation data of the device; and
associating each image of the second plurality of images with the additional location and orientation data detected when that image is captured.

5. The method of claim 4, wherein:
generating the VAR scene based on the first plurality of images captured by the camera of the device comprises assembling the first plurality of images into a spherical VAR scene based on the detected location and orientation data associated with each image of the first plurality of images; and
overlaying the at least one image from the second plurality of images on the at least one image from the first plurality of images comprises overlaying the at least one image from the second plurality of images on the spherical VAR scene based on the location and orientation data associated with the at least one image from the second plurality of images.

6. The method of claim 5, wherein overlaying the at least one image from the second plurality of images on the spherical VAR scene comprises:
blending the at least one image from the second plurality of images with the spherical VAR scene.

7. The method of claim 6, wherein the blending comprises one or more of direct placement, blending using a Gaussian mask, Poisson blending, or seaming.

8. A device comprising:
at least one processor; and
at least one non-transitory computer readable storage medium storing instructions that, when executed by the at least one processor, cause the device to:
generate a virtual or augmented reality (VAR) scene based on a first plurality of images captured by a camera of the device;
generate dynamic content that varies over spatial domain of the VAR scene, the dynamic content comprising a second plurality of images captured by the camera of the device;
detect a first location of the device;
based on detecting the first location of the device, present a first view of the VAR scene comprising a first portion of the dynamic content overlaid over the VAR scene by overlaying at least an image from the second plurality of images on at least one image from the first plurality of images;
detect a second location of the device; and
based on detecting the second location of the device, present a second view of the VAR scene comprising a second portion of the dynamic content overlaid over the VAR scene by overlaying at least one an additional image from the second plurality of images on at least one image from the first plurality of images.

9. The device of claim 8, wherein the VAR scene comprises a static base VAR scene.

10. The device of claim 8, further comprising instructions that, when executed by the at least one processor, cause the device to, before generating the VAR scene based on the first plurality of images captured by the camera of the device, capture the first plurality of images by:
   detecting location and orientation data of the device; and
   associating each image of the first plurality of images with the location and orientation data detected when that image is captured.

11. The device of claim 10, further comprising instructions that, when executed by the at least one processor, cause the device to, before generating the dynamic content for a portion of the VAR scene, capture the second plurality of images by:
   receiving a selection to capture the second plurality of images with the device in a starting location and orientation;
   detecting additional location and orientation data of the device; and
   associating each image of the second plurality of images with the additional location and orientation data detected when that image is captured.

12. The device of claim 11, further comprising instructions that, when executed by the at least one processor, cause the device to:
   generate the VAR scene based on the first plurality of images captured by the camera of the device by assembling the first plurality of images into a spherical VAR scene based on the detected location and orientation data associated with each image of the first plurality of images; and
   overlay at least the image from the second plurality of images on the at least one image from the first plurality of images by, based on detecting the first location of the device, overlaying at least the image from the second plurality of images on the spherical VAR scene based on the location and orientation data associated with the image from the second plurality of images.

13. The device of claim 12, wherein overlaying at least the image from the second plurality of images on the spherical VAR scene comprises:
   blending the image from the second plurality of images with the spherical VAR scene.

14. The device of claim 13, wherein the blending comprises one or more of direct placement, blending using a Gaussian mask, Poisson blending, or seaming.

15. A non-transitory computer readable storage medium storing instructions thereon that, when executed by at least one processor, cause a device to:
   generate a virtual or augmented reality (VAR) scene based on a first plurality of images captured by a camera of the device;
   generate dynamic content for a portion of the VAR scene, the dynamic content comprising a second plurality of images captured by the camera of the device;
   detect a first orientation of the device;
   based on detecting the first orientation of the device, present a first view of the VAR scene on the device;
   detect a second orientation of the device; and
   based on detecting the second orientation of the device, present a second view of the VAR scene comprising the dynamic content overlaid over the VAR scene by overlaying at least one image from the second plurality of images on at least one image from the first plurality of images and varying over time the at least one image from the second plurality of images.

16. The non-transitory computer readable storage medium of claim 15, further comprising instructions that, when executed by the at least one processor, cause the device to vary the at least one image from the second plurality of images by varying the at least one image further over time within the VAR scene.

17. The non-transitory computer readable storage medium of claim 15, further comprising instructions that, when executed by the at least one processor, cause the device to, before generating the VAR scene based on the first plurality of images captured by the camera of the device, capture the first plurality of images by:
   detecting location and orientation data of the device; and
   associating each image of the first plurality of images with the location and orientation data detected when that image is captured.

18. The non-transitory computer readable storage medium of claim 17, further comprising instructions that, when executed by the at least one processor, cause the device to, before generating the dynamic content for the portion of the VAR scene, capture the second plurality of images by:
   receiving a selection to capture the second plurality of images with the device in a starting location and orientation;
   detecting additional location and orientation data of the device; and
   associating each image of the second plurality of images with the additional location and orientation data detected when that image is captured.

19. The non-transitory computer readable storage medium of claim 18, further comprising instructions that, when executed by the at least one processor, cause the device to:
   generate the VAR scene based on the first plurality of images captured by the camera of the device by assembling the first plurality of images into a spherical VAR scene based on the detected location and orientation data associated with each image of the first plurality of images; and
   overlay the at least one image from the second plurality of images on the at least one image from the first plurality of images by overlaying the at least one image from the second plurality of images on the spherical VAR scene based on the location and orientation data associated with the at least one image from the second plurality of images.

20. The non-transitory computer readable storage medium of claim 19, further comprising instructions that, when executed by the at least one processor, cause the device to overlay the at least one image from the second plurality of images on the spherical VAR scene by:
   blending the at least one image from the second plurality of images with the spherical VAR scene, wherein the blending comprises one or more of direct placement, blending using a Gaussian mask, Poisson blending, or seaming.

* * * * *